United States Patent
Hayashi et al.

[11] Patent Number: 6,027,834
[45] Date of Patent: Feb. 22, 2000

[54] NICKEL POSITIVE ELECTRODE AND ALKALINE STORAGE BATTERY USING THE SAME

[75] Inventors: Kiyoshi Hayashi; Katsuyuki Tomioka; Nobuyasu Morishita; Munehisa Ikoma, all of Toyohashi, Japan

[73] Assignee: Matsushita Electric Industrial Co., Ltd., Osaka, Japan

[21] Appl. No.: 08/937,797

[22] Filed: Sep. 25, 1997

[30] Foreign Application Priority Data

Sep. 30, 1996 [JP] Japan .................................. 8-258494

[51] Int. Cl.⁷ ....................................................... H01M 4/32
[52] U.S. Cl. ............................................................. 429/223
[58] Field of Search .............................................. 429/223

[56] References Cited

U.S. PATENT DOCUMENTS

| | | | |
|---|---|---|---|
| 5,344,728 | 9/1994 | Ovshinsky et al. | 429/223 |
| 5,466,543 | 11/1995 | Ikoma et al. | 429/59 |
| 5,506,076 | 4/1996 | Miyamoto et al. | 429/223 |
| 5,773,169 | 6/1998 | Matasuda et al. | 429/223 |
| 5,788,943 | 8/1998 | Aladjov | 423/594 |
| 5,804,334 | 9/1998 | Yamamura et al. | 429/218 |

FOREIGN PATENT DOCUMENTS

| | | |
|---|---|---|
| 61-104565 | 5/1986 | Japan . |
| 4248973 | 9/1992 | Japan . |
| 6103973 | 4/1994 | Japan . |
| 9411910 | 5/1994 | WIPO . |
| 9719479 | 5/1997 | WIPO . |

OTHER PUBLICATIONS

European Search Report dated Apr. 29, 1999.
Patent Abstracts of Japan, vol. 096, No. 006, Jun. 28, 1996 & JP 08 045508 A (Sumitomo Metal Mining Co., Ltd.), Feb. 16, 1996.
Tanaka et al. "Improvement of high temperature performance for NiMH battery," 63$^{rd}$ Electrochemistry Society of Japan Spring Convention. 1996 No Month or Day Available.

*Primary Examiner*—Maria Nuzzolillo
*Assistant Examiner*—Monique M. Wills
*Attorney, Agent, or Firm*—Stevens, Davis, Miller & Mosher, L.L.P.

[57] ABSTRACT

For providing an alkaline storage battery having a high energy density in a broader temperature range, the charge efficiency of a nickel positive electrode at the time of charging at high temperatures is enhanced by incorporating verbium and at least two elements selected from the group consisting of yttrium, and ytterbium in the form of a compound those and further at least one element selected from the group consisting of lanthanum, praseodymium, neodymium, samarium, gadolinium, terbium, dysprosium, holmium, thulium, cerium, promethium, europium, and lutetium in the form of a compound into a positive electrode paste containing a major component of nickel oxide as an active material.

24 Claims, 4 Drawing Sheets

NICKEL POSITIVE ELECTRODE AND ALKALINE STORAGE BATTERY USING THE SAME

BACKGROUND OF THE INVENTION

This invention relates to a positive electrode for an alkaline storage battery comprising nickel oxide as the main component and an alkaline storage battery using the positive electrode, particularly to a nickel-hydrogen storage battery having improved characteristics.

Recently, there has been an intensive need for high energy density secondary batteries associated with portable appliances which are made much more valuable, compact and lighter in weight. Similarly, such new high energy density secondary batteries are also vigorously sought for power supplies for electric automobiles. To meet to these desires, in the technical field of nickel-cadmium batteries (referred to hereinafter as the Ni-Cd battery), there has been developed a Ni-Cd battery having a higher capacity using a conventional sintered nickel positive electrode, and further a much higher energy density Ni-Cd battery using a foamed metal type nickel positive electrode having a capacity of 30 to 60% higher than that of the sintered nickel positive electrode. Moreover, there has been developed a nickel-hydrogen storage battery having a higher capacity than those of Ni-Cd batteries (the higher capacity is at least two times that of the Ni-Cd battery using the sintered nickel positive electrode) by use of a hydrogen storage alloy as a negative electrode. In these high capacity alkaline storage batteries, a three-dimensional porous body such as a bulk formed porous nickel body or a porous fibrous nickel body having a high porosity (at least 90%) is filled with a nickel hydroxide powder at a high density in order to achieve an improvement in capacity of the positive electrode. As a result, the capacity density has been increased thereby to 550 to 650 mAh/cm3 while the capacity density of the conventional sintered nickel positive electrode is 400 to 500 mAh/cm$^3$.

These nickel positive electrodes, however, have a common problem that their energy density can be maintained at ordinary temperatures, but reduced at high temperatures atmosphere. Accordingly, it has been difficult to take advantage of the characteristics of high energy density in a broader temperature range. The cause thereof is that, in the charging under a high temperature atmosphere, an oxygen evolving reaction tends to be caused simultaneously with the charge reaction in which nickel hydroxide is charged into nickel oxyhydroxide. That is, the oxygen evolving overvoltage at the positive electrode is reduced, whereby nickel hydroxide is not sufficiently charged into nickel oxyhydroxide and the charging efficiency of the positive electrode is reduced, so that the utilization of nickel hydroxide is lowered. To solve this problem, the following methods have been proposed:

(1) A method in which a cadmium oxide powder and a cadmium hydroxide powder is added to the positive electrode.
(2) A method in which cadmium oxide is incorporated into a nickel hydroxide powder (see JP-A-61-104,565).
(3) A method in which a compound comprising yttrium, indium, antimony, barium or beryllium is incorporated into the positive electrode (see Japanese Patent Application No. 4-248 973 publication No. P-A-6-103,973.
(4) A method in which a compound of erbium or ytterbium is added alone to the positive electrode [see Reprint of the 63rd Electrochemistry Society Spring Convention (1996)].

In the above-mentioned methods (1) and (2), the presence of cadmium oxide added or incorporated into the nickel hydroxide powder improves the rate of utilization of the nickel hydroxide under a high temperature atmosphere. However, even in these cases, the rate of utilization of nickel hydroxide under a high temperature atmosphere is usually about 80%. In order to further increase the rate of the utilization, it is necessary to increase the amount of cadmium oxide to be added, and by increasing the amount of cadmium oxide, the rate of the utilization of nickel hydroxide under a high temperature atmosphere can be increased to about 90%. However, the increase of the amount of cadmium oxide to be added causes a problem of adversely diminishing the rate of the utilization of nickel hydroxide at ordinary temperatures. Moreover, from the viewpoint of environmental pollution, a nickel-hydrogen storage battery which does not contain cadmium is preferred. However, when cadmium oxide is not added, the utilization of nickel hydroxide is lowered to about 50 to 60%.

The above-mentioned method (3) has been proposed to solve these problems. According to this method, the oxygen evolving overvoltage at the time of charging under a high temperature atmosphere is increased by absorbing a compound of yttrium or the like on the surface of nickel oxide, and the charge reaction of nickel hydroxide into nickel oxyhydroxide is sufficiently effected, whereby the utilization under a high temperature atmosphere is increased. According to this method, it is possible to increase the utilization of nickel hydroxide at 45° C. to about 80% or more. Also, it has been reported that in the above method (4), the same effect is obtained by adding a compound of erbium or ytterbium alone.

However, in order to meet a recent desire of making the capacity higher, it is necessary to develop an additive which, even when added in a small amount, acts effectively to enhance the charge efficiency under a high temperature atmosphere, thereby further increasing the utilization of nickel hydroxide under a high temperature atmosphere. Moreover, it is considered necessary that the utilization be further increased by a method which comprises adsorbing said effective additive on not only the surface of the nickel oxide but also the surface of the support and the surfaces of positive electrode-constituting materials such as cobalt, cobalt hydroxide, cobalt oxide, zinc oxide, zinc hydroxide and the like to enhance the oxygen overvoltage of the whole of the positive electrode plate. In addition, it is considered necessary to uniformize the reaction in the positive electrode plate to prevent the swelling of the active material. From such a viewpoint, the problem to be solved by this invention is to enhance the utilization of the active material under a high temperature atmosphere and further enhance the cycle life.

SUMMARY OF THE INVENTION

For solving the above problem, this invention provides a paste type nickel positive electrode for use in an alkaline storage battery obtained by filling a support composed of an electrically conductive three-dimensional porous body or an electrically conductive plate with a positive electrode paste containing a major component of nickel oxide and drying the same, characterized in that the above positive electrode paste has incorporated thereinto at least two elements selected from the group consisting of yttrium, erbium and ytterbium in the form of a compound; or alternatively has incorporated thereinto at least one element selected from the group consisting of yttrium, erbium and ytterbium in the form of a compound and further at least one element selected from the group consisting of lanthanum, praseodymium, neodymium, samarium, gadolinium, terbium, dysprosium, holmium, thulium, cerium, promethium, europium and lutetium in the form of a compound. The above paste type nickel positive electrode gives a high capacity in a broader temperature range and is excellent in cycle life.

According to this invention, there is also provided an alkaline storage battery in which the above paste type nickel positive electorate is used and which gives a high capacity in a broader temperature range and is excellent in cycle life.

Incidentally, the nickel oxide referred to in the present specification means a material which acts as an active material in a nickel positive electrode and includes nickel hydroxide, nickel oxyhydroxide and materials comprising nickel hydroxide and nickel oxyhydroxide as the major components and other elements such as cobalt, zinc, magnesium, manganese, aluminum and the like in the form of a solid solution, a complex oxide or the like.

DETAILED DESCRIPTION OF THE INVENTION

Figure 1:
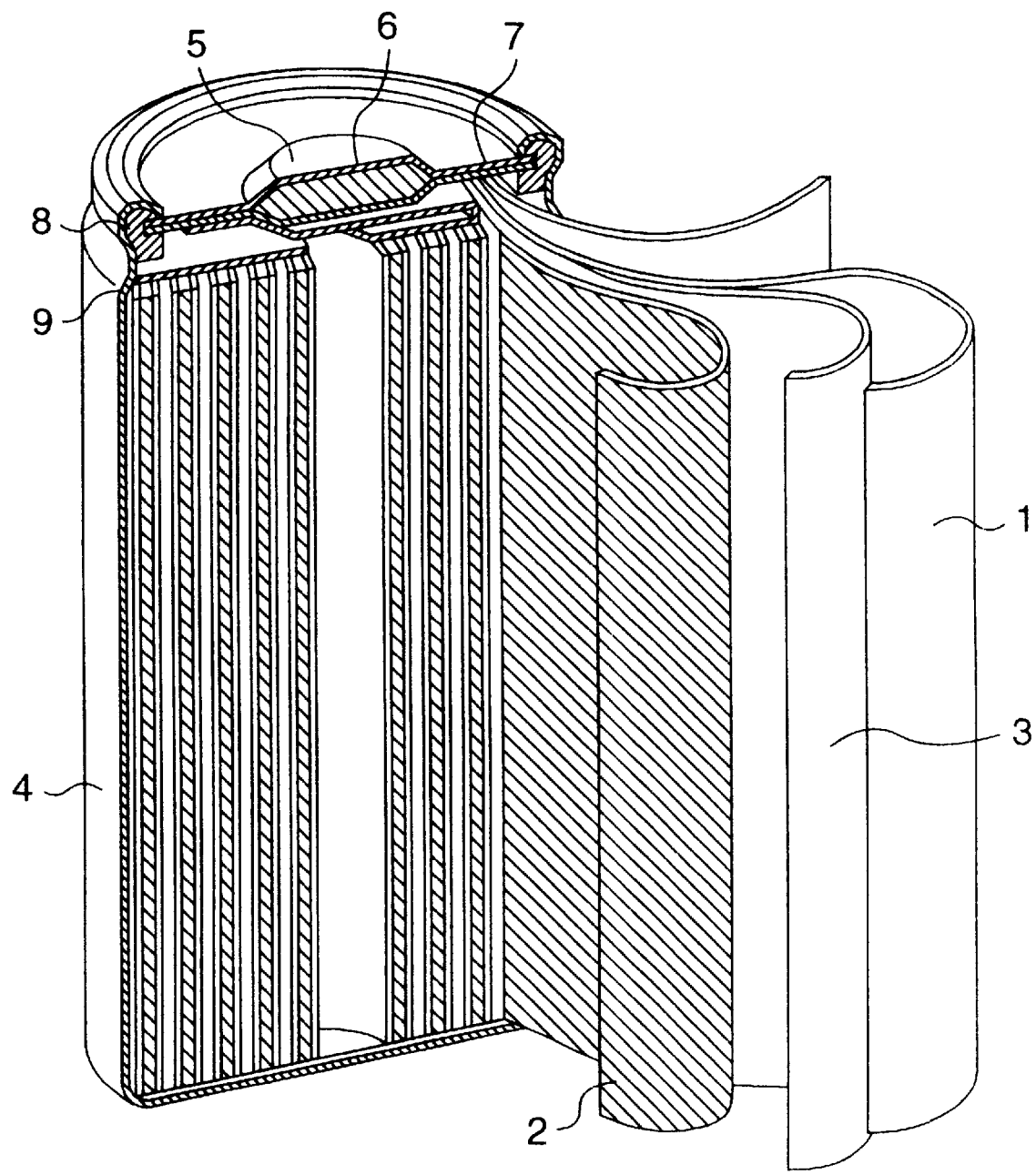
FIG. 1 is a sectional view of a battery prepared as an example of this invention.

By adding the additives as mentioned above to a nickel positive electrode paste, a great effect is obtained even in a smaller amount than in the conventional methods where a yttrium compound or the like is added alone. The additives of the invention are physically adhered to or adsorbed on the surfaces of the positive electrode-constituting materials such as an active material in the course of mixing and kneading for the preparation of the paste. In the present invention, it is inferred that by adding different kinds of additives, the agglomeration between the additives and the agglomeration between the positive electrode-constituting materials are prevented, and the additives are uniformly distributed on the surface of the active material and adhered to or adsorbed on the surfaces of the materials, whereby the effect of the additives are enabled to extend to the fine structures of the electrode, the oxygen overvoltage of the whole of the electrode can be heightened, and a great effect has consequently been obtained on the enhancement of utilization of the positive electrode active material. In other words, it is considered that when, among the compounds of the above-mentioned various elements, the compounds of yttrium, erbium or ytterbium is added with different additives, the effects of enhancing the oxygen-generation overvoltage of positive electrodes have been greatly amplified as compared with the case of addition of the single compound.

Furthermore, when a compound of yttrium, erbium or ytterbium which has a solubility in the positive electrode paste or an electrolyte is added, the adsorption of the compound on the surface of the nickel oxide and the surfaces of positive electrode-constituting materials such as cobalt, cobalt hydroxide, cobalt oxide, zinc oxide, zinc hydroxide and the like proceeds more uniformly and, simultaneously therewith, the compound adsorbs on the surface of the support. Also, the added compound is dissolved and present in the alkaline electrolyte, whereby the oxygen-generation overvoltage during charging under a high temperature atmosphere is increased and the effect of inhibiting the oxygen evolving reaction becomes much greater. Simultaneously therewith, the efficiency of charge reaction of nickel oxide into nickel hydroxide can be further enhanced.

The charge reaction of the active material (nickel hydroxide) is shown in formula (1) and the oxygen evolving reaction at the time of this charge is shown in formula (2):

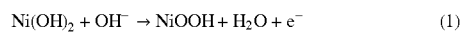

$$Ni(OH)_2 + OH^- \rightarrow NiOOH + H_2O + e^- \quad (1)$$

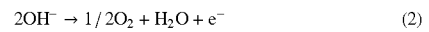

$$2OH^- \rightarrow 1/2 O_2 + H_2O + e^- \quad (2)$$

In the present invention, the utilization of nickel hydroxide under a high temperature atmosphere can be heightened while the high utilization of nickel hydroxide at ordinary temperatures is kept, and an excellent effect can be obtained by adding the additives of this invention in a small amount, so that the filling with a sufficient amount of the active material can be secured. As a result, there is obtained a high capacity positive electrode for an alkaline storage battery in which the positive electrode is excellent in active material utilization in a broader temperature range, and a high performance alkaline storage battery can be constructed using the electrode. Moreover, among the additives in the positive electrode of the present invention, those dissolved in the electrolyte also contribute to the enhancement of the characteristics of a hydrogen storage alloy negative electrode, so that the present invention is effective particularly when applied to a nickel-hydrogen storage battery.

DESCRIPTION OF THE PREFERRED EMBODIMENTS

Examples are shown below to explain this invention in more detail.

EXAMPLE 1

The positive electrode used in the present Example was prepared as follows: A spherical nickel hydroxide powder in which cobalt and zinc formed solid solutions with nickel in each proportion of 1.5% by weight based on the weight of the nickel; a cobalt powder; a cobalt hydroxide powder; a zinc oxide powder; and the additive constituent(s) shown in Table 1 were mixed at a weight ratio of 100:7:5:3:1. Water was added to the resulting mixture and the mixture was kneaded to prepare a positive electrode paste. A porous support of foamed nickel having a porosity of 95% and a surface density of 300 g/cm² was filled with the above positive electrode paste, dried and pressed, and thereafter, cut to the given size (thickness: 0.5 mm, length: 110 mm and width: 35 mm) to prepare various nickel positive electrodes. Each of these positive electrode plates was prepared so that when it was assumed that nickel oxide underwent one-electron reaction by charge and discharge, the theoretical capacity became 1,000 mAh.

TABLE 1

Relation between battery No. and mixing ratio of additive constituents

| | | | | Mixing ratio 3 | | | | |
|---|---|---|---|---|---|---|---|---|
| | $Y_2O_3$ | $Er_2O_3$ | $Yb_2O_3$ | $Ho_2O_3$ | $Dy_2O_3$ | $Lu_2O_3$ | $Gd_2O_3$ | $Tm_2O_3$ |
| Mixing ratio 7 | | | | | | | | |
| $Y_2O_3$ | A1 | A2 | A3 | A4 | A5 | A6 | A7 | A8 |
| $Er_2O_3$ | B1 | B2 | B3 | B4 | B5 | B6 | B7 | B8 |
| $Yb_2O_3$ | C1 | C2 | C3 | C4 | C5 | C6 | C7 | C8 |
| $Ho_2O_3$ | D1 | D2 | D3 | D4 | D5 | D6 | D7 | D8 |
| $Dy_2O_3$ | E1 | E2 | E3 | E4 | E5 | E6 | E7 | E8 |
| $Sm_2O_3$ | F1 | F2 | F3 | F4 | F5 | F6 | F7 | F8 |
| $Gd_2O_3$ | G1 | G2 | G3 | G4 | G5 | G6 | G7 | G8 |
| $Nd_2O_3$ | H1 | H2 | H3 | H4 | H5 | H6 | H7 | H8 |

Among the positive electrodes shown in Table 1, those in which the additive comprises only one constituent (A1, B2, C3, D4, E5 and G7) and those which contained none of $Y_2O_3$, $Er_2O_3$ and $Yb_2O_3$ (D4~D8, E4~E8, F4~F8, G4~G8 and H4~H8) are Comparative Examples. When the additive was composed of two constituents, the mixing ratio of the two was 7:3. That is, in the additive in battery A2, $Y_2O_3$:$Er_2O_3$=7:3, and the proportions of the positive electrode-constituting materials other than the support in the positive electrode were such that $Ni(OH)_2$:Co:Co(OH)$_2$:ZnO:$Y_2O_3$:$Er_2O_3$=100:7:5:3:0.7:0.3 by weight.

The structure of the battery prepared is shown in FIG. 1. A positive electrode 2 prepared as mentioned above and a hydrogen storage alloy negative electrode 1 in which $MmNi_{3.6}Co_{0.7}Mn_{0.4}Al_{0.3}$ were spirally rolled through a sulfonated separator 3 being interposed therebetween, and inserted into a battery case 4 which also acts as a negative electrode terminal. Thereinto was poured 2.0 cm$^3$ of an alkaline electrolyte in which lithium hydroxide was dissolved in a proportion of 20 g/liter in an aqueous potassium hydroxide solution having a specific gravity of 1.3, after which the case 4 was sealed with a sealing plate 7 provided with a relief valve 6 to prepare a sealed nickel-hydrogen storage battery of an AA size having a theoretical capacity of 1,000 mAh in which the battery capacity was controlled by the positive electrode. In FIG. 1, 8 refers to an insulating gasket and 9 to a positive current collector electrically connecting the positive electrode 2 to the sealing plate 7. In this way, various batteries were prepared using positive electrodes in which various additives as shown in Table 1 were used, and subjected to a charge and discharge test to evaluate the utilizations of positive electrode active materials. In the charge and discharge test, the battery was charged at a charge rate of 0.1 C for 15 hours in an ambient atmosphere at a temperature of 25° C. and 45° C., and then left to stand for 3 hours at 25° C. and thereafter discharged in an ambient atmosphere at 25° C. until reaching 1.0 V. After performing a charge and discharge cycle under the above-mentioned conditions, the discharge capacity in the second cycle was measured. The rate of the utilization of nickel hydroxide which was the positive electrode active material was determined from the following equation:

Rate of utilization of the positive electrode active material (%)= [discharge capacity (mAh)/1,000 (mAh)]×100.

The rates of utilization of the positive electrode active material in an ambient atmosphere at 25° C. are shown in Table 2. As can be seen from Table 2, in an ambient atmosphere at 25° C., the difference in kind of additive resulted in substantially no difference, and in all cases, the rates of the utilization as high as 93 to 96% were shown.

TABLE 2

Relation between the additive constituents and the rates of utilization of the positive electrode active material in an ambient atmosphere at 25° C.

| | | | | Mixing ratio 3 | | | | |
|---|---|---|---|---|---|---|---|---|
| | $Y_2O_3$ | $Er_2O_3$ | $Yb_2O_3$ | $Ho_2O_3$ | $Dy_2O_3$ | $Lu_2O_3$ | $Gd_2O_3$ | $Tm_2O_3$ |
| Mixing ratio 7 | | | | | | | | |
| $Y_2O_3$ | 96 | 95 | 95 | 96 | 94 | 95 | 95 | 94 |
| $Er_2O_3$ | 94 | 95 | 94 | 95 | 95 | 96 | 96 | 95 |
| $Yb_2O_3$ | 93 | 95 | 94 | 94 | 95 | 94 | 94 | 96 |
| $Ho_2O_3$ | 95 | 96 | 95 | 96 | 94 | 95 | 95 | 94 |
| $Dy_2O_3$ | 96 | 94 | 96 | 96 | 94 | 96 | 94 | 94 |
| $Sm_2O_3$ | 94 | 95 | 94 | 95 | 95 | 95 | 96 | 95 |
| $Gd_2O_3$ | 95 | 96 | 95 | 94 | 95 | 96 | 96 | 96 |
| $Nd_2O_3$ | 94 | 94 | 95 | 95 | 94 | 95 | 95 | 94 |

The relation between the additive constituents and the rates of utilization of the positive electrode active material when the battery was charged in an ambient atmosphere at 45° C. are shown in Table 3.

TABLE 3

Relation between the additive constituents and the rate of utilization of the positive electrode active material in an ambient atmosphere at 45° C.

| Mixing ratio 7 | Mixing ratio 3 | | | | | | | |
|---|---|---|---|---|---|---|---|---|
| | $Y_2O_3$ | $Er_2O_3$ | $Yb_2O_3$ | $Ho_2O_3$ | $Dy_2O_3$ | $Lu_2O_3$ | $Gd_2O_3$ | $Tm_2O_3$ |
| $Y_2O_3$ | 83 | 87 | 88 | 86 | 88 | 86 | 88 | 87 |
| $Er_2O_3$ | 88 | 82 | 89 | 88 | 87 | 85 | 86 | 88 |
| $Yb_2O_3$ | 89 | 88 | 82 | 87 | 86 | 86 | 87 | 87 |
| $Ho_2O_3$ | 87 | 86 | 87 | 54 | 56 | 53 | 60 | 54 |
| $Dy_2O_3$ | 88 | 87 | 86 | 56 | 55 | 56 | 56 | 54 |
| $Sm_2O_3$ | 88 | 87 | 86 | 55 | 54 | 55 | 55 | 54 |
| $Gd_2O_3$ | 87 | 86 | 86 | 58 | 50 | 55 | 56 | 57 |
| $Nd_2O_3$ | 38 | 88 | 85 | 56 | 54 | 58 | 54 | 54 |

When an additive comprising any of $Y_2O_3$, $Er_2O_3$ and $Yb_2O_3$ was used, the rates of utilization of the positive electrode active material were 82 to 89%. In particular, when two of $Y_2O_3$, $Er_2O_3$ and $Yb_2O_3$ were used or one of the above was used with another compound listed in Table 3, the rates of the utilization were 3 to 7% higher than those in Comparative Examples (battery Nos. A1, B2 and C3) in which an additive composed of only one of $Y_2O_3$, $Er_2O_3$ or $Yb_2O_3$. Further, in all Comparative Examples in which an additive comprising none of $Y_2O_3$, $Er_2O_3$ and $Yb_2O_3$ was used, the rates of the utilization were as low as 50 to 60%.

Thus, in all the Examples of this invention in which an additive comprises one member selected from $Y_2O_3$, $Er_2O_3$ and $Yb_2O_3$ as an essential component and one additional component which was different from the essential component and was selected from $Y_2O_3$, $Er_2O_3$, $Yb_2O_3$, $Ho_2O_3$, $Dy_2O_3$, $Lu_2O_3$, $Gd_2O_3$, $Tm_2O_3$, $Sm_2O_3$ and $Nd_2O_3$, high positive electrode active material utilizations were obtained in a broad temperature range.

EXAMPLE 2

Figure 2:
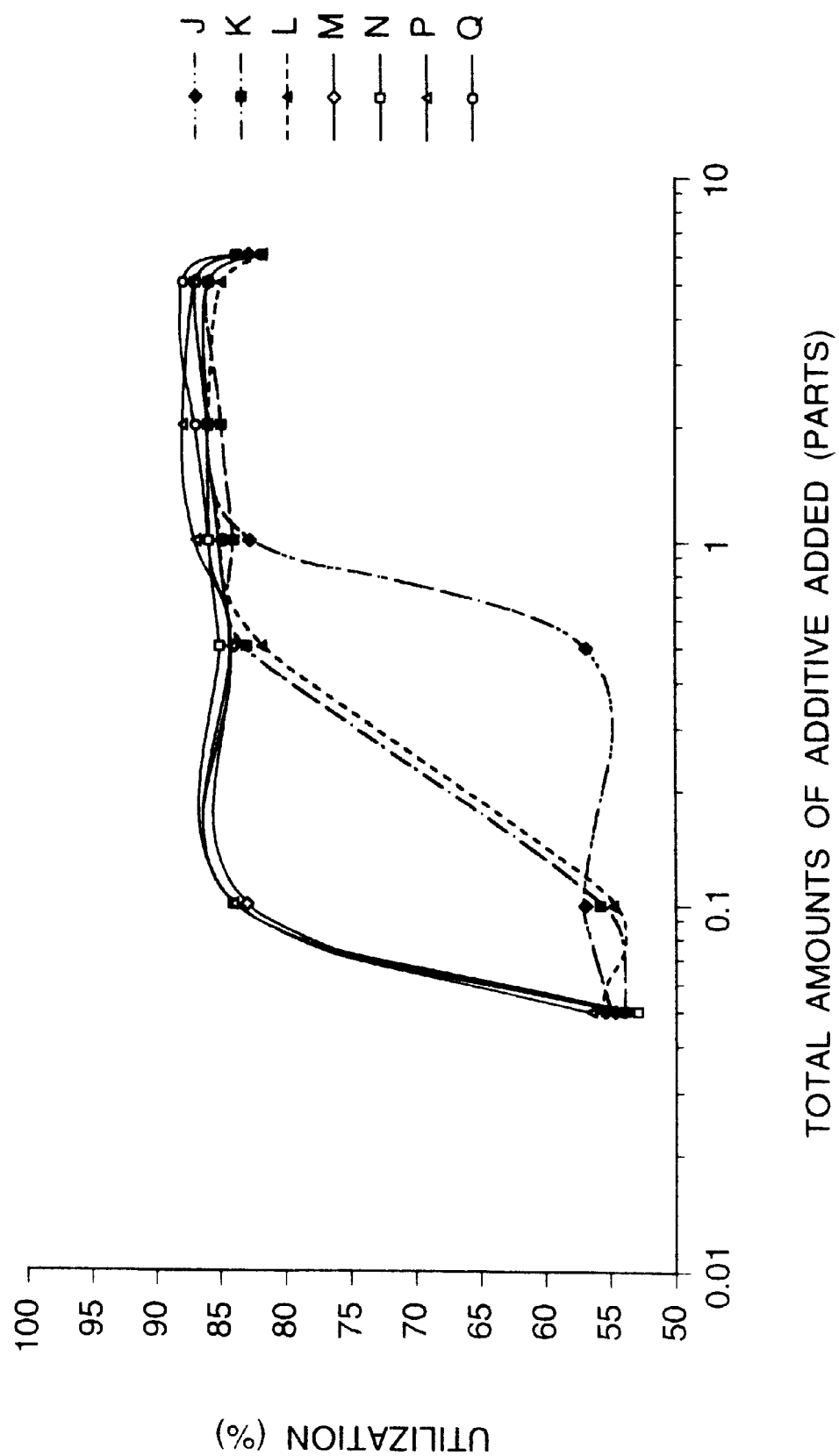
FIG. 2 is a graph showing a relation between the amount of an additive added and the utilization of a positive electrode active material in the battery prepared as an example of this invention.
Figure 3:
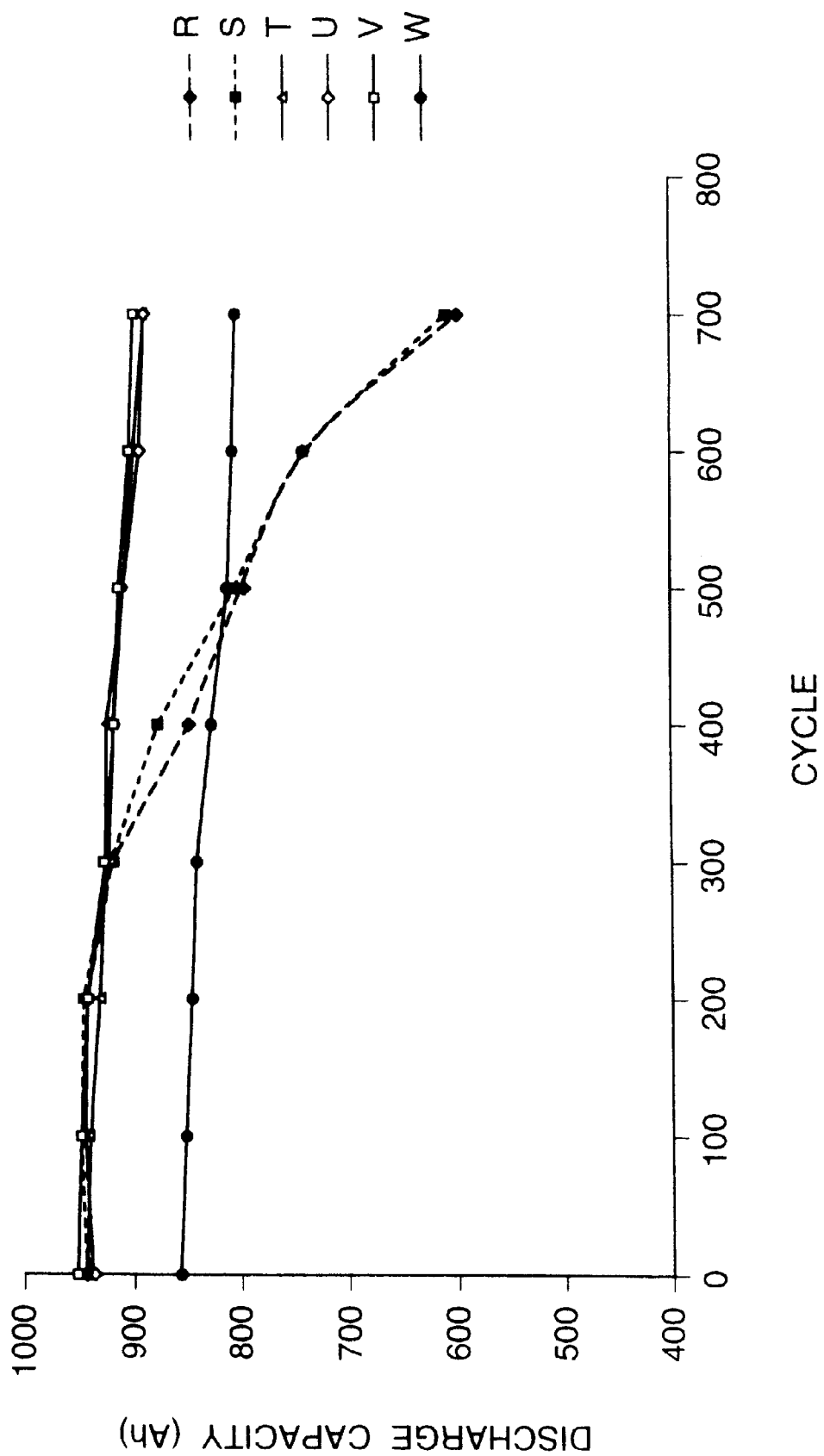
FIG. 3 is a graph showing a relation at 25° C. between the amount of an additive added and the cycle life characteristics in the battery in the Example of this invention.
Figure 4:
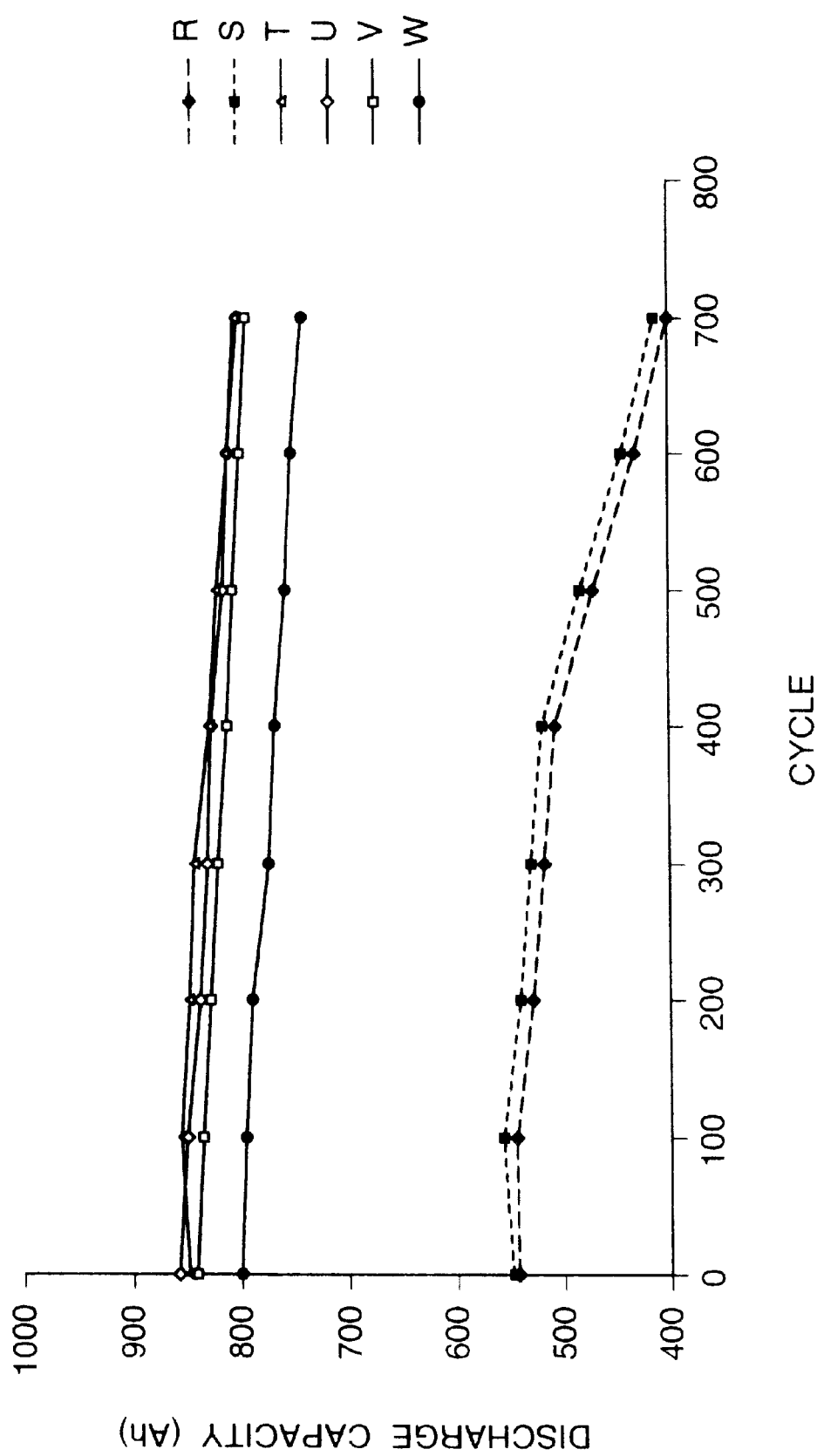
FIG. 4 is a graph showing a relation at 45° C. between the amount of an additive added and the cycle life characteristics in the battery in the Example of this invention.

One of the various additives shown in Table 4 was mixed with $Ni(OH)_2$, Co, $Co(OH)_2$ and ZnO so that the weight ratio of $Ni(OH)_2$:Co:$Co(OH)_2$:ZnO: the additive became 100:3:7:3:X (X is shown in Table 5), and positive electrode plates were prepared using the resulting mixtures in the same manner as in Example 1, after which sealed nickel-hydrogen storage batteries of an AA size were prepared using the resulting positive electrode plates and subjected to the same charge and discharge test as in Example 1 to determine the rates of the positive electrode active material utilization in the batteries. The results obtained are shown in FIGS. 2, 3 and 4.

TABLE 4

Relation between the battery-classifying symbol and the mixing ratio of additive constituents

| Battery-classifying symbol | $Y_2O_3$ | $Er_2O_3$ | $Yb_2O_3$ | Total of left three components | $Ho_2O_3$ | $Dy_2O_3$ | $Lu_2O_3$ | $Gd_2O_3$ | $Tm_2O_3$ |
|---|---|---|---|---|---|---|---|---|---|
| J | 5 | 2 | — | 7 | 33 | 30 | 22 | 3 | 5 |
| K | 5 | 5 | — | 10 | 30 | 30 | 22 | 3 | 5 |
| L | — | 5 | 5 | 10 | 30 | 25 | 30 | 5 | — |
| M | 45 | 5 | — | 50 | 5 | 20 | 15 | 5 | 5 |
| N | 25 | 25 | 25 | 75 | 5 | 5 | 5 | 5 | 5 |
| P | 50 | 15 | 15 | 80 | 5 | 10 | — | 5 | — |
| Q | 80 | 10 | 10 | 100 | — | — | — | — | — |

TABLE 5

Relation between battery No. and the total amount of additive added

| Battery classifying symbol | Total amount of additive added (parts) | | | | | | |
|---|---|---|---|---|---|---|---|
| ↓ | 0.05 | 0.1 | 0.5 | 1.0 | 2.0 | 5.0 | 6.0 |
| J | J1 | J2 | J3 | J4 | J5 | J6 | J7 |
| K | K1 | K2 | K3 | K4 | K5 | K6 | K7 |
| L | L1 | L2 | L3 | L4 | L5 | L6 | L7 |
| M | M1 | M2 | M3 | M4 | M5 | M6 | M7 |
| N | N1 | N2 | N3 | N4 | N5 | N6 | N7 |
| P | P1 | P2 | P3 | P4 | P5 | P6 | P7 |
| Q | Q1 | Q2 | Q3 | Q4 | Q5 | Q6 | Q7 |

TABLE 6

Relation between the total amount of additive added and the total amount of the essential components selected from $Y_2O_3$, $Er_2O_3$ and $Yb_2O_3$ added in each battery

| | Total amount of additive added (X) (parts) | | | | | | |
|---|---|---|---|---|---|---|---|
| | 0.05 | 0.1 | 0.5 | 1.0 | 2.0 | 5.0 | 6.0 |
| Total amount of essential compo- | 0.0035 | 0.007 | 0.035 | 0.07 | 0.14 | 0.35 | 0.42 |
| | 0.005 | 0.01 | 0.05 | 0.1 | 0.2 | 0.5 | 0.6 |

TABLE 6-continued

Relation between the total amount of additive added and the total amount of the essential components selected from $Y_2O_3$, $Er_2O_3$ and $Yb_2O_3$ added in each battery

|  | Total amount of additive added (X) (parts) | | | | | | |
|---|---|---|---|---|---|---|---|
|  | 0.05 | 0.1 | 0.5 | 1.0 | 2.0 | 5.0 | 6.0 |
| nents added (Y) | 0.005 | 0.01 | 0.05 | 0.1 | 0.2 | 0.5 | 0.6 |
| (parts) | 0.025 | 0.05 | 0.25 | 0.5 | 1.0 | 2.5 | 3.0 |
|  | 0.0375 | 0.075 | 0.375 | 0.75 | 1.5 | 3.75 | 4.5 |
|  | 0.04 | 0.08 | 0.4 | 0.8 | 1.6 | 4.0 | 4.8 |
|  | 0.05 | 0.1 | 0.5 | 1.0 | 2.0 | 5.0 | 6.0 |

The relation between the battery-classifying symbol and the mixing ratio of the additive constituents is shown in Table 4, the relation between battery No. and the total amount (X) of the additive added is shown in Table 5, and the relation between the total amount (X) of the additive added shown in Table 5 and the total amount (Y) of the essential components selected from $Y_2O_3$, $Er_2O_3$ and $Yb_2O_3$) added in each battery is shown in Table 6.

The relation between the amounts (X or Y) of the additives in each battery and the rates of utilization of nickel hydroxide charged at 45° C. are shown in FIG. 2. As seen from FIG. 2, in some batteries the rate of the utilization of nickel hydroxide at 45° C. is as low as 53 to 57% when the total amount (X) of the additive added is less than 0.1 parts by weight based on the 100 parts by weight of $Ni(OH)_2$. Hereafter, the amount of the additive is based on the 100 parts by weight of nickel oxide. In addition, when the total amount (X) becomes 6 parts by weight, the rate of the utilization becomes 2 to 6% lower than where the total amount (X) is 5 parts by weight. In the case of 25° C., it is confirmed that the rate of the utilization tends to be lowered similarly, so that the total amount (X) is desirably 0.1 to 5 parts by weight.

In battery Nos. J2 and J3, the total amount (X) is 0.1 parts by weight or more; however, the total amount (Y) of the essential components selected from $Y_2O_3$, $Er_2O_3$ and $Yb_2O_3$ is slight (not more than 0.05 parts by weight), so that the effect of addition is small. Similarly, in battery No. Q1, only $Y_2O_3$, $Er_2O_3$ and $Yb_2O_3$ are added; and, no effect of addition is seen because the amount of the additive added is as small as 0.05 parts by weight. Thus, the amount (Y) of the essential components selected from $Y_2O_3$, $Er_2O_3$ and $Yb_2O_3$ added is desirably 0.1 to 5 parts by weight.

EXAMPLE 3

Using the additive M used in Example 2 (additive M means herein the additive shown in the battery-classifying symbol M in Table 4), a paste was prepared with the weight ratio of $Ni(OH)_2:Co:Co(OH)_2:ZnO$: additive M=100:3:7:3:Z. Using the resulting paste, positive electrode plates were prepared in the same manner as in Example 1, and used to prepare sealed nickel-hydrogen storage batteries of an AA size. The relation between battery No. and the amount of the additive added (Z) is shown in Table 7.

TABLE 7

Relation between battery No. and the amount of additive added

| Battery No. | R | S | T | U | V | W |
|---|---|---|---|---|---|---|
| Added amount Z | 0 | 0.05 | 0.1 | 1 | 5 | 6 |

These batteries were subjected to a cycle life test in which the battery was charged at a charging rate of 0.2 C for 6 hours in an ambient atmosphere at a temperature of each of 25° C. and 45° C. and thereafter discharged at a discharging rate of 0.2 C until reaching 1.0 V. The relations between the discharge capacity and the number of cycles are shown in FIGS. 3 (25° C.) and 4 (45° C.).

As can be seen from FIG. 3, in the case of 25° C., the batteries T, U and V in which the amount of the additive is 0.1 to 5 parts by weight maintains a high discharge capacity even when the number of cycles exceeds 700. However, the batteries R and S in which the amount of the additive added is smaller show a reduction of discharge capacity after 400 cycles. The battery W in which the amount of the additive added is higher does not show a capacity reduction with cycle; however, the initial discharge capacity thereof is low. In the results at 45° C. in FIG. 4, the same tendency as in the case of 25° C. is shown, and the batteries R and S in which the amount of the additive added is smaller show a remarkably low initial discharge capacity and the capacity reduction with cycle is also marked.

Subsequently, for inspecting the degree of deterioration due to oxidation of negative electrode hydrogen storage alloy of the battery at 25° C. after more than 700 cycles, the oxygen content of the alloy was measured by a non-dispersive infrared absorption method and the results obtained are shown in Table 8.

TABLE 8

| Battery No. | R | S | T | U | V | W |
|---|---|---|---|---|---|---|
| Oxygen content | 10.5 | 9.4 | 6.2 | 5.8 | 6.0 | 5.8 |

Table 8 indicates that in the battery in which the additive is added in a proportion of at least 0.1 parts by weight to the positive electrode, the oxidation of the negative electrode is inhibited. This tendency is the same as in the case of the battery tested at 45° C. From this fact, it is considered that the additive has an effect of inhibiting oxygen from being generated from the positive electrode and, simultaneously, the additive in the positive electrode is dissolved in the electrolyte and deposited on the surface of the hydrogen storage alloy in the negative electrode, whereby the deposited additive contributes to the inhibition of oxidation of the alloy.

In the above Examples, $Y_2O_3$, $Er_2O_3$, $Yb_2O_3$, $Ho_2O_3$, $Dy_2O_3$, $Lu_2O_3$, $Gd_2O_3$, $Tm_2O_3$, $Sm_2O_3$ and $Nd_2O_3$ were used as the additive constituents. Similarly, when $La_2O_3$, $Ce_2O_3$, $Pr_6O_{11}$, $Pr_2O_3$, $Pm_2O_3$, $Eu_2O_3$ and $Tb_4O_7$ were used as additional components to be added to the essential component, and when the oxides of various elements used in the Examples or mentioned above were replaced by hydroxides of these elements, the same results were obtained. Equally, with respect to halides, nitrates, sulfates and the like of these elements, the same effects were confirmed.

Furthermore, the additives can broadly be applied to paste type nickel positive electrodes in which other porous materials, for example, a porous fibrous nickel body, a sintered porous nickel body, expanded metals, foils, punched metals formed by processing the foils, and the like are used as the support for the positive electrode active material. In addition, these positive electrodes can be broadly applied to all alkaline storage batteries for example in which an alkaline electrolyte comprising sodium hydroxide and the like in addition to aqueous solutions of potassium hydroxide and lithium hydroxide is used and cadmium, zinc, hydrogen storage alloy or the like is used as the negative electrode. In these batteries the common effect of this invention can be obtained; however, particularly when it is applied to a nickel-hydrogen storage battery in which a hydrogen storage alloy is used, a greater effect can be obtained.

As described above, according to this invention, there can be provided an positive electrode for an alkaline storage battery in which a high capacity is obtained in a broader temperature range and which is excellent in cycle life, and there can also be provided a high performance alkaline storage battery in which this positive electrode is used.

What is claimed is:

1. A paste type nickel positive electrode for use in alkaline storage batteries comprising (a) a positive electrode paste containing (i) a major component of nickel oxide as an active material and (ii) a compound of erbium and at least one member selected from the group consisting of a compound of yttrium and a compound of ytterbium and combinations thereof and (b) a support composed of one of an electrically conductive three-dimensional porous body and an electrically conductive plate supporting the paste.

2. A paste type nickel positive electrode for use in alkaline storage batteries comprising (a) a positive electrode paste containing (i) a major component of nickel oxide as an active material and (ii) a compound of erbium and at least one member selected from the group consisting of a compound of yttrium and a compound of ytterbium and combinations thereof and further at least one member selected from the group consisting of a compound of lanthanum, a compound of praseodymium, a compound of neodymium, a compound of samarium, a compound of gadolinium, a compound of terbium, a compound of dysprosium, a compound of holmium, a compound of thulium, a compound of cerium, a compound of promethium, a compound of europium, and a compound of lutetium and (b) a support composed of one of an electrically conductive three-dimensional porous body and an electrically conductive plate supporting the paste.

3. The paste type nickel positive electrode according to claim 1, wherein the compounds incorporated into the positive electrode paste are selected from the group consisting of $Y_2O_3$, $Y(OH)_3$, $La_2O_3$, $La(OH)_3$, $Pr_6O_{11}$, $Pr_2O_3$, $Nd_2O_3$, $Sm_2O_3$, $Gd_2O_3$, $Gd(OH)_3$, $Tb_4O_7$, $DY_2O_3$, $Ho_2O_3$, $Er_2O_3$, $Tm_2O_3$, $Yb_2O_3$, $Ce_2O_3$, $Pm_2O_3$, $Eu_2O_3$ and $Lu_2O_3$.

4. The paste type nickel positive electrode according to claim 1, wherein the total contents of said compound of erbium and said at least one member are in an amount of 0.1 to 5 parts by weight based on the 100 parts by weight of the nickel oxide.

5. The paste type nickel positive electrode according to claim 1, wherein said compound of erbium and said at least one member are dissolved in the positive electrode paste or an alkaline electrolyte and adsorbed on the surface of the nickel oxide or the internal surfaces of pores of the nickel oxide.

6. The paste type nickel positive electrode according to claim 1, wherein said compound of erbium and said at least one member are dissolved in the positive electrode paste or an alkaline electrolyte and adsorbed on the surface of the support.

7. The paste type nickel positive electrode according to claim 1, wherein the positive electrode paste further comprises at least one member selected from the group consisting of cobalt, cobalt hydroxide and cobalt oxide.

8. The paste type nickel positive electrode according to claim 7, wherein said compound of erbium and said at least one member are dissolved in the positive electrode paste or an alkaline electrolyte and adsorbed on the surface of at least one member selected from the group consisting of cobalt, cobalt hydroxide and cobalt oxide.

9. The paste type nickel positive electrode according to claim 1, wherein the positive electrode paste further comprises at least one member selected from the group consisting of zinc oxide and zinc hydroxide.

10. The paste type nickel positive electrode according to claim 9, wherein said compound of erbium and said at least one member are dissolved in the positive electrode paste or an alkaline electrolyte and adsorbed on the surface of at least one member selected from the group consisting of zinc oxide and zinc hydroxide.

11. An alkaline storage battery which comprises a paste type nickel positive electrode containing a major component of nickel oxide as an active material, a negative electrode, an alkaline electrolyte, a battery case, and a sealing plate, wherein the paste type nickel positive electrode is as defined in claim 1.

12. The alkaline storage battery according to claim 11, wherein the negative electrode is a hydrogen storage alloy capable of electrochemically occluding and releasing hydrogen.

13. The alkaline storage battery according to claim 12, wherein the compound of erbium and said at least one member are dissolved in the alkaline electrolyte from the positive electrode and adsorbed on the surface of the hydrogen storage alloy.

14. The paste type nickel positive electrode according to claim 2, wherein the compounds incorporated into the positive electrode paste are selected from the group consisting of $Y_2O_3$, $Y(OH)_3$, $La_2O_3$, $La(OH)_3$, $Pr_6O_{11}$, $Pr_2O_3$, $Nd_2O_3$, $Sm_2O_3$, $Gd_2O_3$, $Gd(OH)_3$, $Tb_4O_7$, $Dy_2O_3$, $Ho_2O_3$, $Er_2O_3$, $Tm_2O_3$, $Yb_2O_3$, $Ce_2O_3$, $Pm_2O_3$, $Eu_2O_3$ and $Lu_2O_3$.

15. The paste type nickel positive electrode according to claim 2, wherein the total contents of the at least one member selected from the group consisting of a compound of yttrium, a compound of lanthanum, a compound of praseodymium, a compound of neodymium, a compound of samarium, a compound of gadolinium, a compound of terbium, a compound of dysprosium, a compound of holmium, a compound of erbium, a compound of thulium, a compound of ytterbium, a compound of cerium, a compound of promethium, a compound of europium and a compound of lutetium is in an amount of 0.1 to 5 parts by weight based on 100 parts by weight of the nickel oxide.

16. The paste type nickel positive electrode according to claim 2, wherein the compound of erbium and said at least one member selected from the group consisting of a compound of yttrium and a compound of ytterbium and combinations thereof are dissolved in the positive electrode paste or an alkaline electrolyte and adsorbed on the surface of the nickel oxide or the internal surfaces of pores of the nickel oxide.

17. The paste type nickel positive electrode according to claim 2, wherein the compound of erbium and said at least one element selected from the group consisting of a compound of yttrium and a compound of ytterbium and combinations thereof are dissolved in the positive electrode paste or an alkaline electrolyte and adsorbed on the surface of the support.

18. The paste type nickel positive electrode according to claim 2, wherein the positive electrode paste further comprises at least one member selected from the group consisting of cobalt, cobalt hydroxide and cobalt oxide.

19. The paste type nickel positive electrode according to claim 18, wherein the compound of erbium and said at least one element selected from the group consisting of a compound of yttrium and a compound of ytterbium and combinations thereof are dissolved in the positive electrode paste or an alkaline electrolyte and adsorbed on the surface of at least one member selected from the group consisting of cobalt, cobalt hydroxide and cobalt oxide.

20. The paste type nickel positive electrode according to claim 2, wherein the positive electrode paste further comprises at least one member selected from the group consisting of zinc oxide and zinc hydroxide.

21. The paste type nickel positive electrode according to claim 20, wherein the compound of erbium and said at least one element selected from the group consisting of a compound of yttrium and a compound of ytterbium and combinations thereof are dissolved in the positive electrode paste or an alkaline electrolyte and adsorbed on the surface of at least one member selected from the group consisting of zinc oxide and zinc hydroxide.

22. An alkaline storage battery which comprises a paste type nickel positive electrode containing a major component of nickel oxide as an active material, a negative electrode, an alkaline electrolyte, a battery case, and a sealing plate, wherein the paste type nickel positive electrode is as defined in claim 2.

23. The alkaline storage battery according to claim 22, wherein the negative electrode is a hydrogen storage alloy capable of electrochemically occluding and releasing hydrogen.

24. The alkaline storage battery according to claim 23, wherein the compound of erbium and said at least one element selected from the group consisting of a compound of yttrium and a compound of ytterbium and combinations thereof are dissolved in the alkaline electrolyte from the positive electrode and adsorbed on the surface of the hydrogen storage alloy.

* * * * *